US008767224B2

(12) United States Patent
Tsuji

(10) Patent No.: US 8,767,224 B2
(45) Date of Patent: Jul. 1, 2014

(54) RECORDING DEVICE AND RECORDING AND CUTTING CONTROL METHOD

(75) Inventor: Hiroyuki Tsuji, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 78 days.

(21) Appl. No.: 13/232,911

(22) Filed: Sep. 14, 2011

(65) Prior Publication Data

US 2012/0062927 A1 Mar. 15, 2012

(30) Foreign Application Priority Data

Sep. 15, 2010 (JP) ................................ 2010-206404

(51) Int. Cl.
*G06F 3/12* (2006.01)

(52) U.S. Cl.
USPC .......................................... 358/1.13; 358/1.1

(58) Field of Classification Search
None
See application file for complete search history.

(56) References Cited

U.S. PATENT DOCUMENTS 6,517,190 B2 * 2/2003 Matsumoto et al. ............ 347/35
2002/0191204 A1 * 12/2002 Nishi et al. .................... 358/1.9
2003/0077100 A1 * 4/2003 Hakkaku ....................... 400/621
2005/0046658 A1 * 3/2005 Kojima .......................... 347/19
2007/0014615 A1 * 1/2007 Kasayama et al. ............. 400/76

FOREIGN PATENT DOCUMENTS

JP 2001-063166 A 3/2001
JP 2003-266832 A 9/2003
JP 2003-266835 A 9/2003
JP 2003-335010 A 11/2003
JP 2004-351676 A 12/2004

* cited by examiner

*Primary Examiner* — Marcus T Riley
(74) *Attorney, Agent, or Firm* — Maschoff Brennan

(57) ABSTRACT

A printer includes a transport section which transports a medium, an image recording section which records and lines up a plurality of images in longitudinal direction of the medium based on an image data set which includes a plurality of image data, and a cutting section which obtains image sheets with one image at a time recorded thereon due to cutting of the medium in a width direction of the medium, where the cutting section is provided with a leading edge cutting section which cuts once at a position on a downstream side in the transport direction with regard to a first image out of the plurality of images, and a between-image cutting section which cuts twice at each position between two adjacent images out of the plurality of images where a predetermined margin has been provided.

3 Claims, 10 Drawing Sheets

RECORDING DEVICE AND RECORDING AND CUTTING CONTROL METHOD

Priority is claimed under 35 U.S.C. §119 to Japanese Application No. 2001-206404 filed on Sep. 15, 2010 which is hereby incorporated by reference in its entirety.

BACKGROUND

1. Technical Field

The present invention relates to a recording device which records an image on a recording medium with an elongated shape and a recording and cutting control method.

2. Related Art

In recent years, along with widespread use of digital cameras, various recording devices have been proposed which record digital image data with image quality equivalent to that of a silver halide photograph. As one of these recording devices, there is a recording device where an image sheet with one image at a time recorded thereon is obtained by a plurality of images being printed out on an elongated sheet which is rolled up into a roll shape (so-called paper roll) and the sheet being cut using an auto cutter (for example, JP-A-2003-266832).

Here, the plurality of images are printed continuously without any spaces, but it is difficult to accurately cut boundaries between adjacent images. Due to deviation in the cutting position, an earlier image out of two continuous images may enter the leading edge portion of a later image or the later image may enter the trailing edge portion of the earlier image. In addition, among the plurality of images there may also be blanks in the leading edge portion of the first image and the trailing edge portion of the last image. As a result, when cutting, two cuts are performed having a margin with a predetermined width by a cutter being reciprocated in a width direction of the sheet (for example, JP-A-2003-266832). Due to the two cuts, it is possible to prevent the appearance of the edge portions of the image sheets obtained by cutting from being spoilt.

However, there is a problem in the technique in the related art in that a large amount of strips of cutting waste with the predetermined width are generated due to the two cuts.

SUMMARY

An advantage of some aspects of the invention is that the amount of cutting waste generated is reduced without spoiling the appearance of the edge portions of the image sheets.

It is possible for the invention to be realized by the embodiments and applications below.

Application 1

A recording device is provided with a transport section which transports a recording medium with an elongated shape in a predetermined transport direction which is parallel to a longitudinal direction of the recording medium, an image recording section which records and lines up a plurality of images in the longitudinal direction of the recording medium based on an image data set which includes a plurality of image data, and a cutting section which obtains image sheets with one image at a time recorded thereon due to cutting of the recording medium in a width direction of the recording medium, where the cutting section is provided with a leading edge cutting section which cuts once at a position on a downstream side in the transport direction with regard to a first image out of the plurality of images, and a between-image cutting section which cuts twice at each position between two adjacent images out of the plurality of images where a predetermined margin has been provided.

According to recording device of Application 1, it is sufficient if the position on the downstream side in the transport direction with regard to the first image out of the plurality of images, that is, the leading portion of the plurality of images, is cut once. By setting the cutting position at an inner side of the first image, there is no spoiling of the appearance of the edge portion of the first image sheet. In addition, each position between two adjacent images is cut twice and there is no spoiling of the appearance of the edge portions of the two images. Thus, according to the recording device of Application 1, it is possible to reduce the amount of cutting waste generated without spoiling the appearance of the edge portions of each image sheet.

Application 2

The recording device of Application 1 where the cutting section is further provided with a trailing edge cutting section which cuts once at a position on an upstream side in the transport direction with regard to a last image out of the plurality of images.

According to recording device of Application 2, it is sufficient if the position on the upstream side in the transport direction with regard to the last image out of the plurality of images, that is, the trailing portion of the plurality of images, is cut once. By setting the cutting position at an inner side of the last image, there is no spoiling of the appearance of the edge portion of the last image sheet. Thus, according to the recording device of Application 2, it is possible to further reduce the amount of cutting waste by the amount of the cutting waste of the last image.

Application 3

The recording device of Applications 1 or 2 where the cutting section is provided with a cutting error detection section which detects an error in the cutting and a post-error cutting section which cuts once when an abnormality is detected by the cutting error detection section.

According to recording device of Application 3, in a case where the cutting is stopped during the cutting of the recording medium, the recording medium is cut again once. Due to the cutting, even in a case where the image slightly remains on an unused side of the recording medium, since a single cutting is performed on a leading portion of the recording medium when printing in accordance with continuous print job data, the remaining portion of the image is discarded. Accordingly, it is possible to perform printing in accordance with continuous print job data without any problems.

Application 4

The recording device of any of Applications 1 to 3 is provided with a configuration where the between-image cutting section determines whether or not a difference in colors between the two images is small and performs cutting once instead of cutting twice in a case where it is determined that the difference is small.

According to recording device of Application 4, when cutting between two adjacent images, since the difference in color between the two images is small, the appearance of the edge portions of the image sheets obtained by the cutting are not spoilt even if there is deviation in the cutting position in a single cutting process. In addition, it is possible to further reduce the amount of cutting waste generated by performing a single cutting in this case.

Application 5

A recording and cutting control method including transporting a recording medium with an elongated shape in a predetermined transport direction which is parallel to a longitudinal direction of the recording medium, recording and lining up a plurality of images in the longitudinal direction of the recording medium based on an image data set which includes a plurality of image data, and obtaining image sheets with one image at a time recorded thereon due to cutting of the recording medium in a width direction of the recording medium, where the cutting includes cutting once at a position on a downstream side in the transport direction with regard to a first image out of the plurality of images and cutting twice at each position between two adjacent images out of the plurality of images where a predetermined margin has been provided.

According to the recording and cutting control method of Application 5, it is possible to reduce the amount of cutting waste generated without spoiling the appearance of the edge portions of each image sheet in the same manner as the recording device of Application 1.

Further, it is possible for the invention to be realized by the various embodiments other than Applications 1 to 5, and for example, it is possible to realize an embodiment as a network system or the like provided with the recording device of Application 1 and to realize an embodiment as a computer program which executes Application 5.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, the embodiments of the invention will be described based on applications while referencing the diagrams.

A. First Embodiment

A-1. Entire Configuration of Printer (Hardware Configuration)

Figure 1:
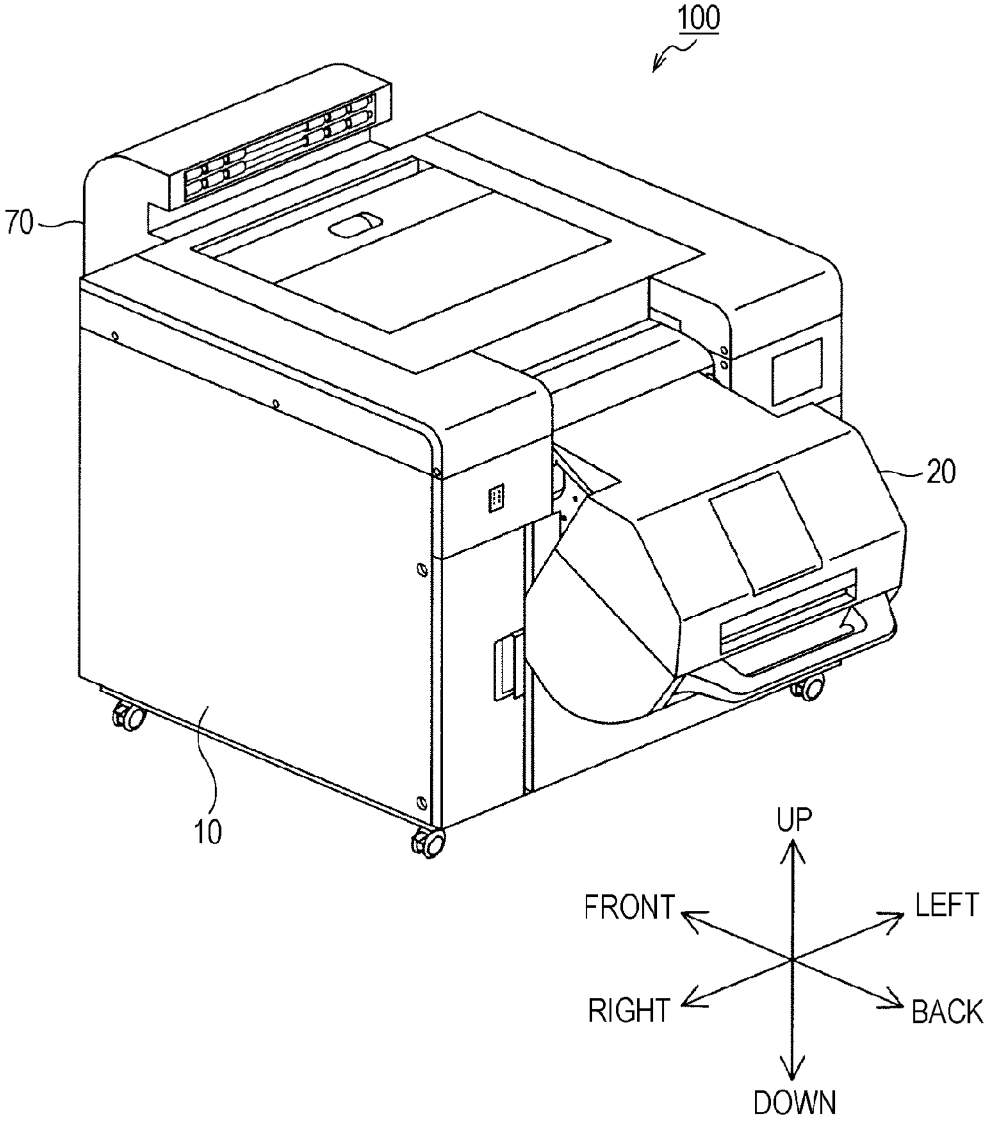
FIG. 1 is a perspective diagram of an outer appearance of an ink jet printer according to a first embodiment of the invention.
Figure 2:
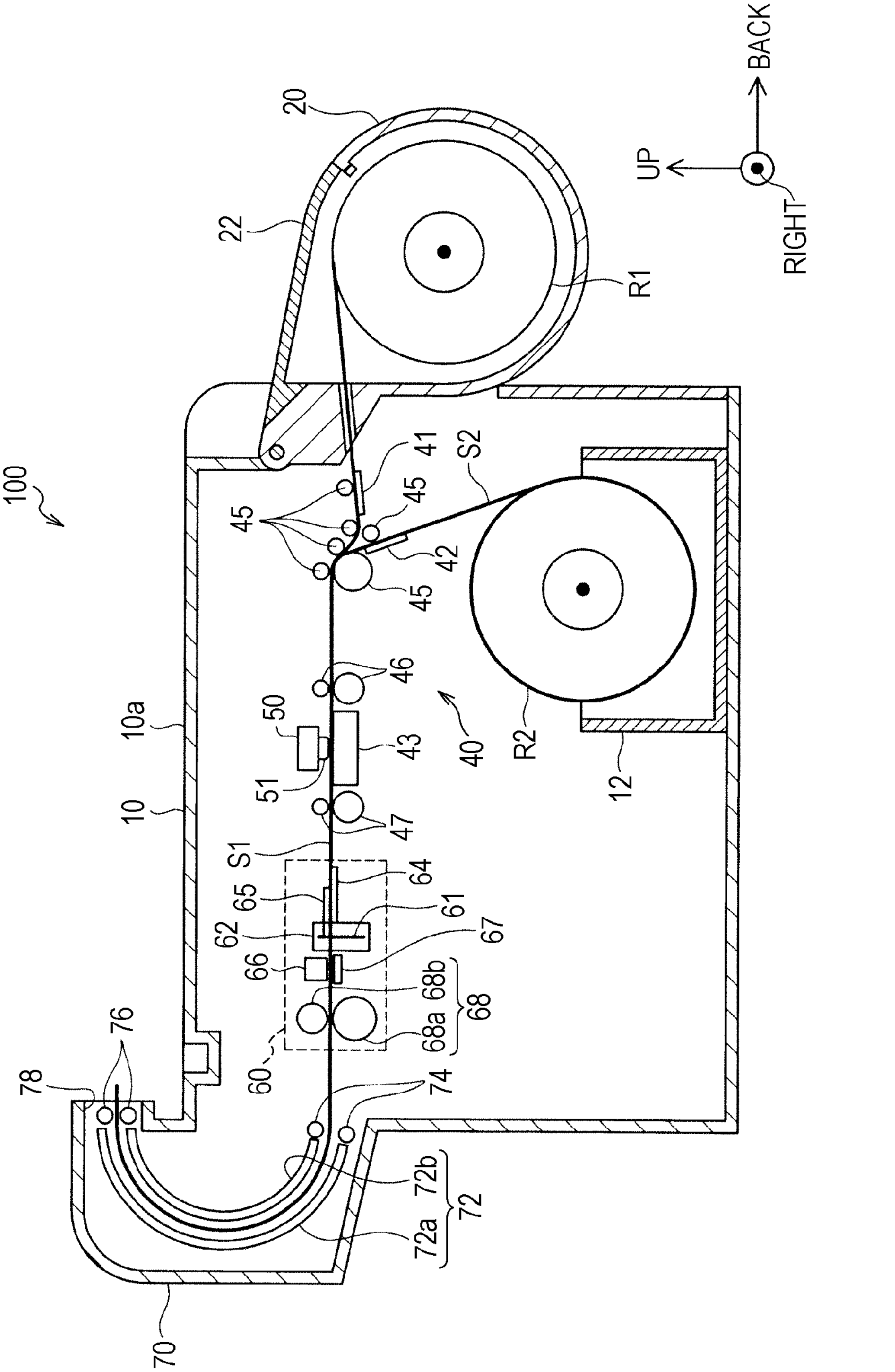
FIG. 2 is a schematic configuration diagram illustrating an outline of an internal configuration of the ink jet printer.

FIG. 1 is a perspective diagram of an outer appearance of an ink jet printer 100 according to a first embodiment of the invention. FIG. 2 is a schematic configuration diagram illustrating an outline of an internal configuration of the ink jet printer 100. Here, in the description below, in cases of "front and rear direction", "up and down direction", and "left and right direction" refer to "front and rear direction", "up and down direction", and "left and right direction" shown by the arrows in FIG. 1 (and FIG. 2) in the absence of particular description.

As shown in FIG. 1, the ink jet printer (referred to below simply as "printer") 100 is provided with a paper feeding device 20 on a rear side of a printer main body 10 and a paper discharge device 70 on a front side of the printer main body 10, and has a configuration where a sheet S1 (FIG. 2) which is a recording medium with an elongated shape is supplied from the rear side by the paper feeding device 20 and is discharged toward the paper discharge device 70 on the front side.

As shown in FIG. 2, the paper feeding device 20 is provided with a roll accommodation section 22 which is able to accommodate a roll R1 where the sheet S1 has been rolled up into a roll shape. By rotating the roll R1 with the core axis as the center, the sheet S1 is unrolled and transported from the roll accommodation section 22 toward the downstream side in a transport direction.

In addition, an opening and closing door (not shown) is provided on an outer side under the printer main body 10, and at an inner side of the opening and closing door, a tray 12 is disposed which is able to accommodate a roll R2, where a sheet S2 which is a recording medium with an elongated shape has been rolled up into a roll shape, in the same manner as the roll accommodation section 22. By rotating the roll R2 accommodated in the tray 12 with the core axis as the center, the sheet S2 is unrolled and transported from the tray 12 toward the downstream side in the transport direction.

The sheet S1 or the sheet S2 (referred to collectively as the "sheet S") which are unrolled from the roll R1 or the roll R2 (referred to collectively as the "roll R") and transported are sent to a transport mechanism 40.

The transport mechanism 40 is provided with a first reception plate 41 which receives the sheet S1 unrolled from the roll R1 in the roll accommodation section 22 along the transport path of the sheet S1 and a second reception plate 42 which receives the sheet S2 unrolled from the roll R2 in the tray 12 along the transport path of the sheet S2. In addition, the transport mechanism 40 is provided with a plurality of transport rollers 45 and a pair of transport rollers 46 and 47 which are provided along the transport paths of each of the sheet S1 and the sheet S2 and transport the sheet S1 and the sheet S2 to a support plate 43 side. The transport mechanism 40 switches the transport path of the sheet S1 and the transport path of the sheet S2 and transports either sheet S to the support plate 43 side.

The support plate 43 is a flat plate which is able to support the sheet S sent by the transport mechanism 40. In a position above the support plate 43 and facing the support plate 43, a carriage 50 is provided which is able to reciprocate in a direction (left and right direction) which intersects with the transport direction of the sheet S using a driving unit (not shown). A recording head 51 is supported in the lower surface of the carriage 50. The lower surface of the recording head 51 is a nozzle formation surface which is horizontal where there are openings for a plurality of nozzles (not shown) which eject ink. The recording head 51 carries out recording by ejecting ink onto the sheet S which is transported through between the recording head 51 and the support plate 43.

The sheet S where recording has been carried out using the recording head 51 is sent to a cutter device 60. The cutter device 60 has a cutter carriage 62, which is provided with rotary cutter (referred to below as "cutter blade") 61, a sheet guide 64 which guides the sheet S to the cutter blade 61, a shearing plate 65 for shearing the sheet S between the shearing plate 65 and the cutter blade 61, a paper presser 66 which presses the sheet S during shearing, a pressurized plate 67 which faces the paper presser 66, and a pair of discharge rollers 68. The cutter blade 61, the paper presser 66, and the pair of discharge rollers 68 are lined up in this order toward the downstream side in the transport direction of the sheet S.

Figure 3:
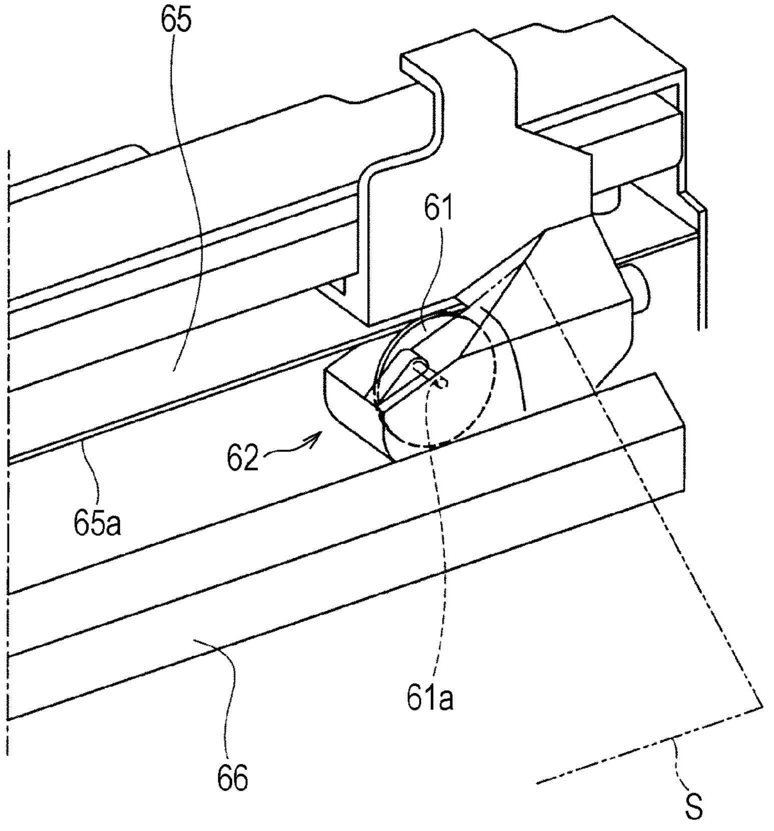
FIG. 3 is an explanatory diagram illustrating the vicinity of a cutter blade and a shearing plate.

FIG. 3 is an explanatory diagram illustrating the vicinity of the cutter blade 61 and the shearing plate 65. As shown in the diagram, the cutter blade 61 is formed in a disk shape, is pivotally supported so as to be able to freely rotate due to being attached to the cutter carriage 62 via a rotation shaft 61*a* which is parallel to the sheet transport direction, and is provided so that the outer circumference portion of the disk surface is in a state which pressurizes an edge portion 65*a* on a downstream side of the shearing blade 65. The cutter carriage 62 reciprocates in a direction (the width direction of the sheet S, that is, the left and right direction) which intersects the transport direction of the sheet S due to a cutter driving motor which will be described later being rotationally driven. Then, at this time, the cutter blade 61 rotates while coming into flexible contact with the edge portion 65*a* of the shearing plate 65 and shears (cuts) the sheet S from below between the cutter blade 61 and the shearing plate 65. As a result, the sheet S with the elongated shape is cut in the width direction.

Here, when cutting, the transport operation of the sheet S is in a state of being stopped and the sheet S is in a state of being pressed from above due to the paper presser 66 provided at the downstream side of the cutter blade 61. The paper presser 66 has a rectangular body, is disposed so that the longitudinal direction thereof matches the width direction of the sheet S, and the width dimension thereof is longer than the width dimension of the sheet S. The pressurized plate 67 (refer to FIG. 2, not shown in FIG. 3) is provided on a lower side of the paper presser 66. The paper presser 66 moves in an up and down direction due to a paper presser moving mechanism (not shown) and is able to apply a predetermined amount of pressure to the upper surface of the sheet S by interposing the sheet S between the paper presser 66 and the pressurized plate 67. The paper presser moving mechanism has a known configuration which operates by receiving a driving force from a stepping motor.

Here, as the configuration which operates the paper presser 66, there is the stepping motor and the paper presser moving mechanism described above, but it is not necessary to limit the configuration to this and other configurations are possible such as a configuration where, for example, pressure is applied by hydraulic pressure or air pressure.

The pair of discharge rollers 68 are formed from a driving roller 68*a* and a driven roller 68*b* which comes into pressurized contact with the driving roller 68*a*, and the cut sheet S is sent to the paper discharge device 70 (FIG. 2) which is disposed downstream.

The paper discharge device 70 is for discharging the sheets S, where recording has been carried out using the recording head 51 and which have been cut by the cutter device 60, from the printer 100. The paper discharge device 70 is provided with a reversing section 72 which reverses the sheet S and pairs of transport rollers 74 and 76 which transport the sheet S. The reversing section 72 is configured by two guide plates 72*a* and 72*b* which are formed with a cross-sectional shape which is substantially an arc and both of the guide plates 72*a* and 72*b* are disposed in parallel with a gap therebetween in the back and forth direction. That is, a curved reversing path is formed between both of the guide plates 72*a* and 72*b*.

In addition, both of the guide plates 72*a* and 72*b* are disposed so that upper edge portions of both of the guide plates 72*a* and 72*b* are disposed higher than the upper surface 10*a* of the printer main body 10 in the up and down direction. The pair of transport rollers 74 is disposed in a position which corresponds to an upstream edge of the reversing path of the reversing section 72. In addition, the pair of transport rollers 76 is disposed in a position which corresponds to a downstream edge of the reversing path. That is, the pair of transport rollers 76 are disposed higher than the upper surface 10*a* of the printer main body 10 in the up and down direction.

The sheet S cut by the cutter device 60 is transported to the downstream side while both front and rear surfaces of the sheet S are reversed by being passed through the reversing path of the reversing section 72. Then, the reversed sheet S is discharged from a discharge port 78, which is disposed on the front side of the printer main body 10 and is higher than the upper surface 10*a*, toward the rear side of the printer main body 10.

Figure 4:
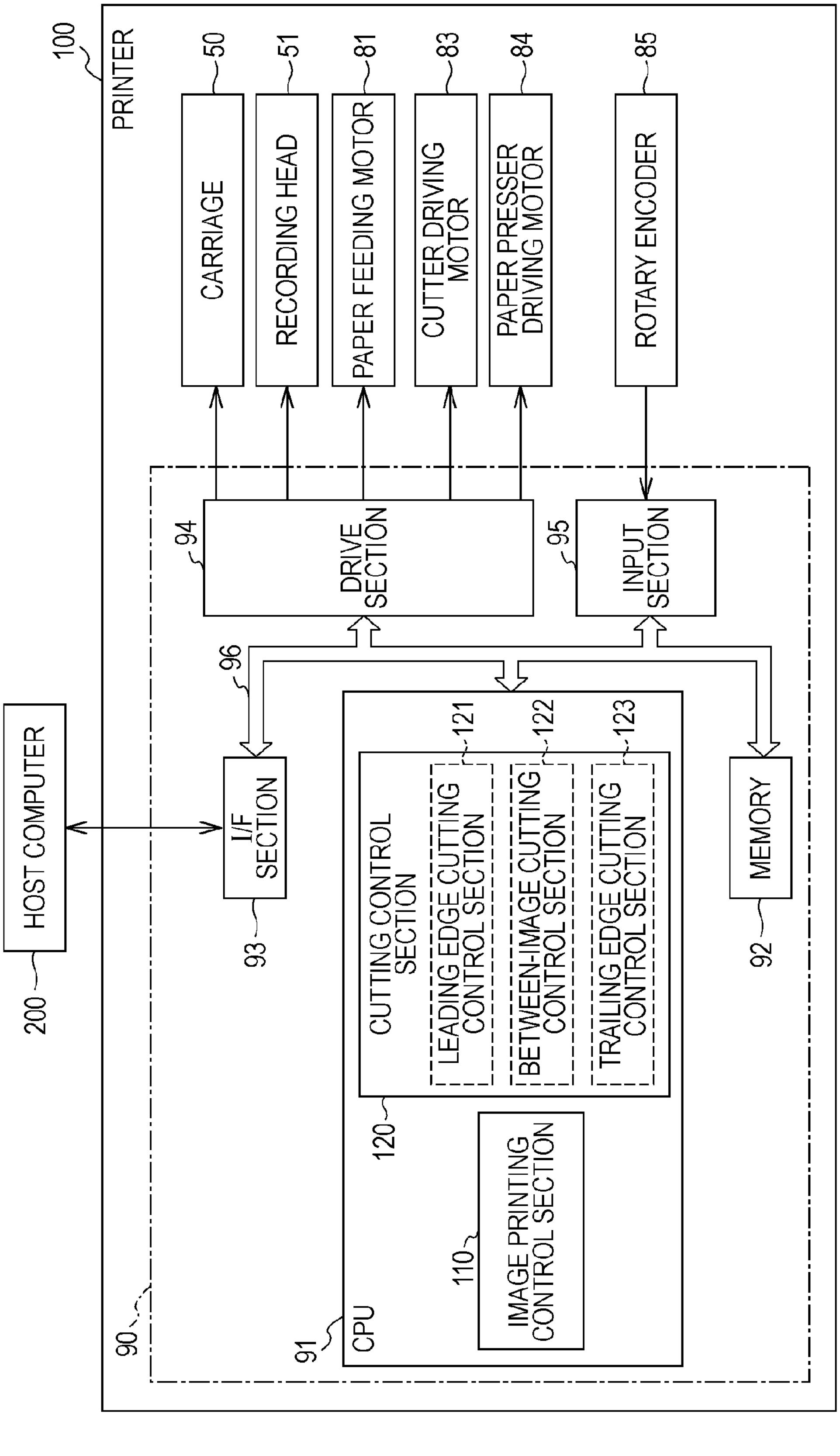
FIG. 4 is a block diagram illustrating an electrical configuration of the printer with a host computer.

FIG. 4 is a block diagram illustrating an electrical configuration of the printer 100 with a host computer 200. As an electrical configuration, the printer 100 is provided with a control device 90 and an actuator, a sensor, and the like which are connected to the control device 90 as shown in the diagram. The control device 90 is mainly provided with a CPU (Central Processing Unit) 91, a memory 92, an I/F (interface) section 93, a drive section 94, an input section 95, and the like. Each of the sections 91 to 95 are connected to each other by a bus 96.

As the actuator, there are the carriage 50 and the recording head 51 described above, a paper feeding motor 81, a cutter driving motor 83, a paper presser driving motor 84, and the like. In the transport mechanism 40, the cutter device 60, and the paper discharge device 70, the transport rollers 45, the pairs of transport rollers 46 and 47, the pair of discharge rollers 68, the pairs of transport rollers 74 and 76 (FIG. 2) described above, and the like are provided, but all of these rollers are connected to one paper feeding motor 81 by a power transmission device (not shown). All of the rollers rotate due to rotation of the paper feeding motor 81. The cutter driving motor 83 is connected to the cutter carriage 62 of the paper discharge device 70 and reciprocates the cutter carriage 62. The paper presser driving motor 84 is a stepping motor which applies a driving force to the paper presser moving mechanism described above, and operates the paper presser which is connected to the paper presser moving mechanism. These actuators are connected to the drive section 94 provided in the control section 90.

As the sensor, a rotary encoder 85, which is provided in any of the rollers provided in the transport mechanism 40, and the like are provided. The rotary encoder 85 detects the rotation amount of the roller and is connected to the input section 95 provided in the control device 90.

Here, the host computer 200 is provided on the outer side of the printer 100. The host computer 200 is connected to the I/F section 93 provided in the control device 90. The control device 90 is able to receive data from and send data to the host computer 200 via the I/F section 93.

In the memory 92, a computer program is stored for obtaining the image sheets with one image at a time recorded thereon by printing the plurality of images on the sheet S based on the data sent from the host computer 200 (print job data which will be described later) and cutting the sheet S. The CPU 91 functions as an image printing control section 110 and a cutting control section 120 by executing a computer program stored in the memory 92. The cutting control section 120 includes a leading edge cutting control section 121, a between-image cutting control section 122, and a trailing edge cutting control section 123. A process executed as the image printing control section 110 and the cutting control section 120 will be described next.

A-2. Image Printing and Cutting Method

Figure 5:
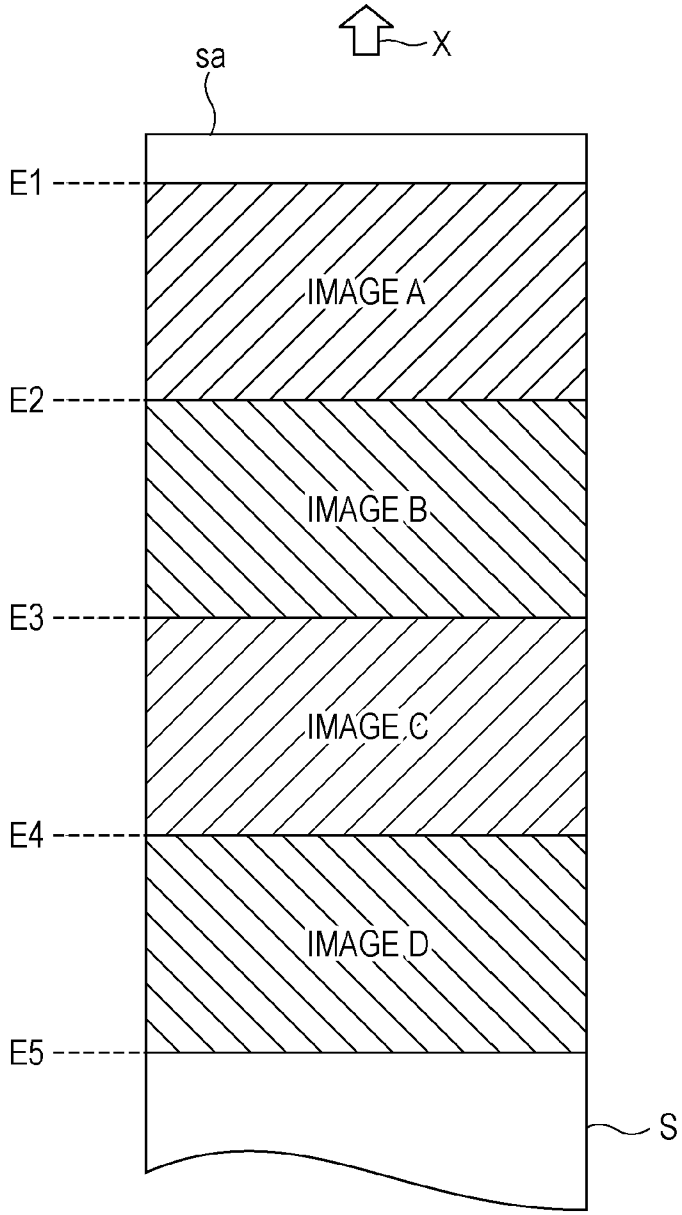
FIG. 5 is an explanatory diagram illustrating one example of a printing form of a sheet with an elongated shape.

FIG. 5 is an explanatory diagram illustrating one example of a printing form of the sheet S with the elongated shape. In the embodiment, as graphically shown in the diagram, an image A, an image B, an image C, and an image D (a region shown by hatching) are continuously printed on the sheet S in this order in a transport direction X of the sheet S. In more detail, the first image A is printed with a spacing with regard to a leading edge Sa of the sheet S. Printing is performed continuously without any spaces between two images which are adjacent (=two adjacent images), that is, between the image A and the image B, between the image B and the image C, and between the image C and the image D.

The printing of the plurality of images A to D described above is performed by the operating of the CPU 91 which functions as the image printing control section 110. That is, the CPU 91 performs control of the image printing so that the recording head 51 is driven while the carriage 50 reciprocates, and the width direction of the sheet S is set as the main scanning direction and the longitudinal direction of the sheet S is set as the sub scanning direction by the driving of the paper feeding motor 81.

The sheet S shown in FIG. 5 is cut in the width direction of the sheet S and is separated into image sheets with the images A, B, C and D recorded thereon one at a time. The separation of the image sheets is performed by the operating of the CPU 91 which functions as the cutting control section 120. That is, the CPU 91 performs cutting control to obtain the image sheets with one image at a time recorded thereon by driving the paper feeding motor 81 while driving the cutter driving motor 83.

A-3. Software Configuration

The job printing control process including the image printing control and the cutting control above will be described in detail below. The job printing control process is a printing control process based on print job data sent from the host computer 200.

Figure 6:
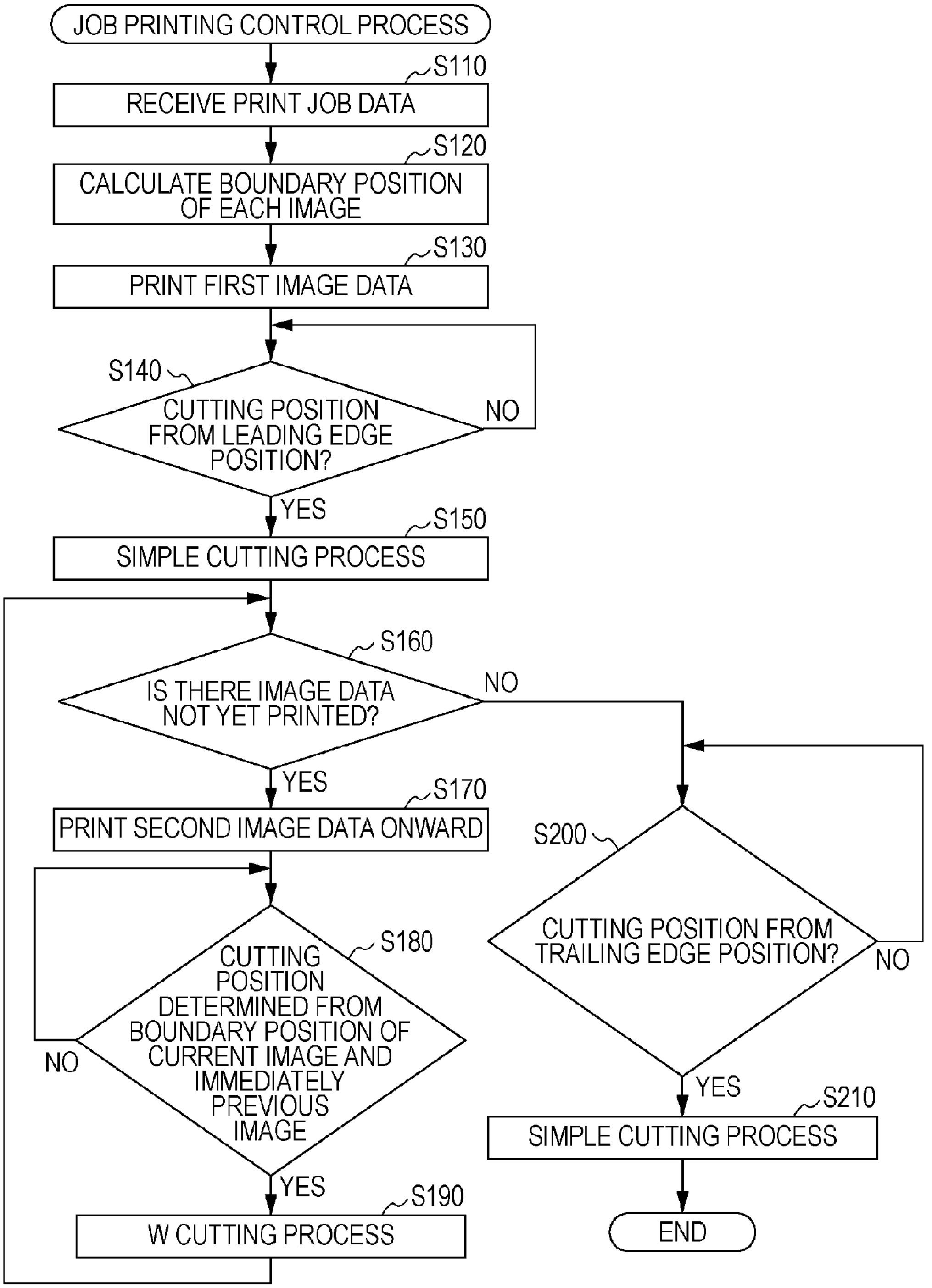
FIG. 6 is a flow chart illustrating a job printing control process which is executed by a CPU.

FIG. 6 is a flow chart illustrating the job printing control process which is executed by the CPU 91 of the control device 90. Here, the flow chart does not show the process of driving the paper feeding motor 81 and transporting the sheet S, but the sheet S is arbitrarily transported as necessary. As shown in the diagram, when the process starts, first, the CPU 91 receives the print job data sent from the host computer 200 (step S110). The print job data is an image data set which includes one or a plurality of image data which expresses an image.

Next, the CPU 91 performs a process where a boundary position in the transport direction X is determined with regard to each image when the respective images expressed by the respective image data are printed on the sheet S based on the size and print resolution of the respective image data included in the print job data (step S120). Since each image is printed continuously without any spaces, in more detail, the boundary position on the downstream side in the transport direction X with regard to the first image (referred to below as "leading edge position"), the boundary positions between two adjacent images, and the boundary position on the upstream side in the transport direction X with regard to the last image (referred to below as "trailing edge position") are determined. Here, the "first image" is the image expressed by the first image data out of the plurality of image data included in the print job data and the "last image" is the image expressed by the last image data out of the plurality of image data included in the print job data.

In the example of FIG. 5, a leading edge position E1 of the series of the plurality of images A to D, respective boundary positions E2, E3, and E4 between the image A and the image B, between the image B and the image C, and between the image C and the image D, and a trailing edge position E5 of the series of the plurality of images A to D are determined. Here, each position E1 to E5 represents the distance from the leading edge Sa of the sheet S.

After executing step S120, the CPU 91 performs a process where the first image data out of the plurality of image data, which were included in the print job data received in step S110, is printed (step S130). The printing is performed with a spacing with regard to the leading edge Sa of the sheet S as described above.

Next, the CPU 91 determines whether or not the cutter blade 61 of the cutter device 60 is in the first boundary position out of the boundary positions determined in step S120, that is, a cutting position which is determined from the leading edge position (step S140) and performs a cutting process where the cutting driving motor 83 is driven and the sheet S is cut at the cutting position (step S150) in a case where it is determined that the cutter blade 61 is at the cutting position. In detail, a single cutting process is performed where the sheet S is cut only once at the cutting position by the driving of the cutter driving motor 83 so that the cutter carriage 62 moves in one direction only. Here, the determination of whether the cutter blade 61 is in the desired cutting position is performed by detecting the rotation amount of the roller in the transport mechanism 40 using the rotary encoder 85 and grasping the movement amount of the sheet. In addition, in the cutting process, cutting is performed in a state where the paper presser driving motor 84 is driven and the paper presser 66 presses the sheet S.

Figure 7A:
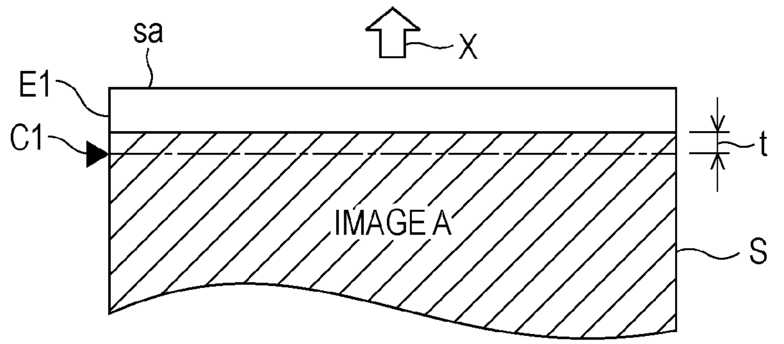
FIGS. 7A to 7C are explanatory diagrams illustrating cutting positions.
Figure 7B:
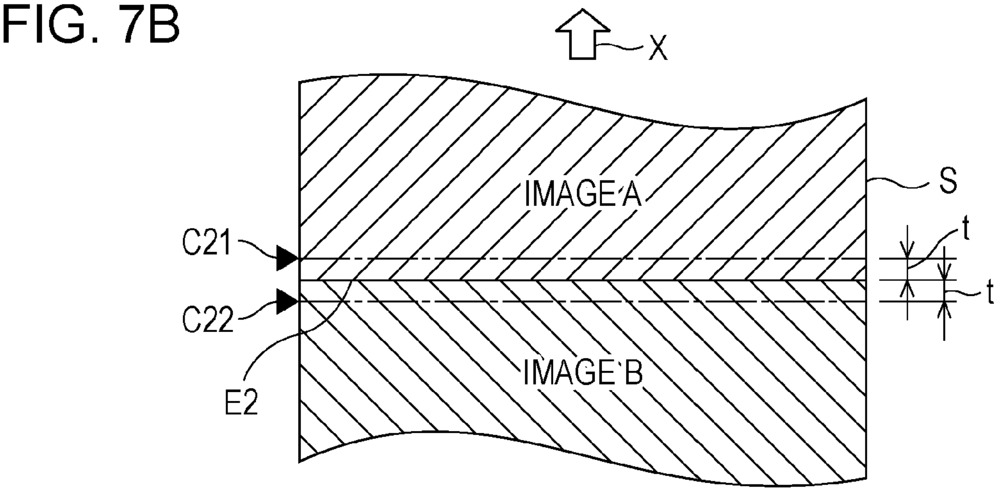
Figure 7C:
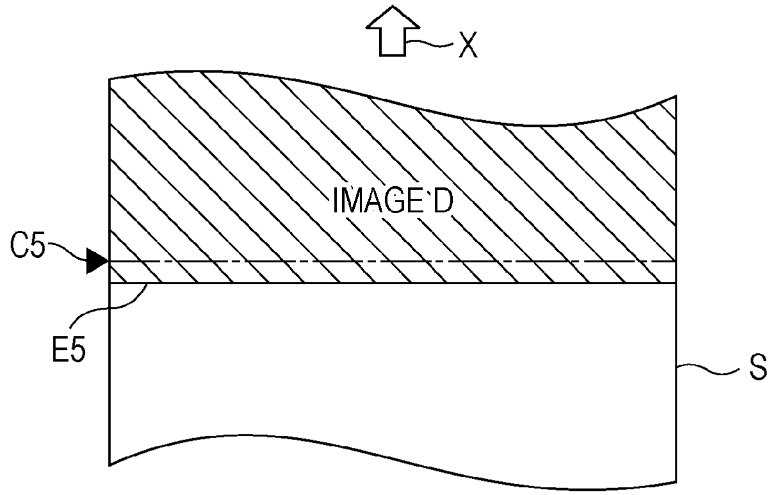

FIGS. 7A to 7C are explanatory diagrams illustrating the cutting positions. FIG. 7A shows the cutting position of the cutting in step S150. As shown in FIG. 7A, the leading edge position is the position E1, but a position separated from the position E1 toward the upstream side in the transport direction X by a predetermined distance t is set as a cutting position C1 (position with the black triangle in the diagram). The predetermined distance t is a short distance, for example, 1.5 mm.

On the other hand, in a case where it is determined in step S140 that the cutter blade 61 is not at the cutting position C1, the process of step S140 is repeated and there is waiting until the cutter blade 61 is positioned at the cutting position C1.

After the single cutting process is performed in step S150, the CPU 91 determines whether or not there is image data which has not been printed in the print job data received in step S110 (step S160) and a process is performed where the next image data (that is, the second image data onward) out of the image data which has not been printed is printed (step S170) in a case where it is determined that there is image data which has not been printed. The printing is continuous without there being any space with the image previously printed, that is, printing so that the images adjoin.

After that, from the boundary positions determined in step S120, the next boundary position, that is, the boundary position between the image printed in step S170 (current image) and the immediately previously printed image is read out and it is determined whether or not the cutter blade 61 of the cutter device 60 is at the cutting position determined from the read-out boundary position (step S180). In a case where it is determined in step S180 that the cutter blade 61 is at the cutting position, a W cutting process is performed where the sheet S is cut twice (step S190).

FIG. 7B shows the cutting position of the cutting in step S190. In FIG. 7B, the boundary position read out in step S180 is the boundary position E2 between the two adjacent images (the image A and the image B), but a position separated from the position E2 in the transport direction X by the predetermined distance t (the same t as in FIG. 7A) is set as a cutting position C21 (position with the black triangle in the diagram) determined in step S180. Furthermore, in step S190, the cutter driving motor 83 is driven so that the cutter carriage 62 reciprocates and the sheet S is cut at the cutting position C21, and after the cutting at the cutting position C21, the paper feeding motor 81 is driven and the sheet S is moved by a distance which is twice as large as t, the cutter driving motor 83 is driven so that the cutter carriage 62 reciprocates, and the sheet S is cut at a cutting position C22 in the diagram. As a result, in regard to the boundary position E2 between the two adjacent images (the image A and the image B), a margin of a predetermined width of 2t centered on the boundary position E2 is provided and cutting is performed twice. Even during the W cutting process, cutting is performed in a state where the paper presser driving motor 84 is driven and the paper presser 66 presses the sheet S.

Here, in a case where it is determined in step S180 that the cutter blade 61 is not at the cutting position C21, the process of step S180 is repeated and there is waiting until the cutter blade 61 is positioned at the cutting position C21.

Returning to FIG. 6, after the W cutting process is performed in step S190, the CPU 91 returns the process to step S160 and repeatedly executes the process from step S160 onward. By repeatedly executing the process from step S160 to step S190, each of the third image data onward are printed, and in regard to the boundary positions (E2 to E4 in the example of FIG. 5) between the printed image and the image one before the printed image, a margin of the predetermined width of 2t centered on the boundary position is provided and cutting is performed twice.

On the other hand, in a case where it is determined in step S160 that there is no image data which has not been printed, the CPU 91 determines whether or not the cutter blade 61 of the cutter device 60 is in a cutting position which is determined from the leading edge position determined in step S120 (step S200) and performs a cutting process where the cutting driving motor 83 is driven and the sheet S is cut at the cutting position (step S210) in a case where it is determined that the cutter blade 61 is at the cutting position. In detail, a single cutting process is performed where the sheet S is cut only once at the cutting position by the driving of the cutter driving motor 83 so that the cutter carriage 62 moves in one direction only. Even in the cutting process, cutting is performed in a state where the paper presser driving motor 84 is driven and the paper presser 66 presses the sheet S.

FIG. 7C shows the cutting position of the cutting in step S210. In FIG. 7C, the trailing edge position is the position E5, but a position separated from the position E5 toward the downstream side in the transport direction X by the predetermined distance t is set as a cutting position C5 (position with the black triangle in the diagram). Here, the distance t is the same as in FIG. 7A. After executing step S210, the CPU 91 ends the job printing control process.

Here, in a case where it is determined in step S200 that the cutter blade 61 is at the cutting position C5, the process of step S200 is repeated and there is waiting until the cutter blade 61 is moved to the cutting position C5. In the job printing control process, the steps S120, S140, and S150 correspond to the leading edge cutting control section 121 (FIG. 4), the steps S120, S160, and S170 correspond to the between-image cutting control section 122 (FIG. 4), and the steps S120, S200, and S210 correspond to the trailing edge cutting control section 123 (FIG. 4).

A-4. Effect of Embodiment

According to the printer 100 configured as above, when cutting while printing the plurality of images on the sheet S, single cutting is performed at the position on the downstream side in the transport direction with regard to the first image out of the plurality of images, a margin with a predetermined margin is provided and W cutting is performed at each position between two adjacent images out of the plurality of images, and single cutting is performed at the position on the upstream side in the transport direction with regard to the last image out of the plurality of images. As a result, since single cutting is sufficient at the position on the downstream side in the transport direction with regard to the first image and at the position on the upstream side in the transport direction with regard to the last image, it is possible to reduce the amount of cutting waste generated.

Since the single cutting with regard to the first image is performed at the cutting position which slightly enters the inner side of the first image, the appearance of the edge portion of the first image sheet is not spoilt. In addition, since the single cutting with regard to the last image is performed at the cutting position which slightly enters the inner side of the last image, the appearance of the edge portion of the last sheet is not spoilt. Here, although the single cutting is performed with the position on the upstream side in the transport direction entering the inner side of the image with regard to the last image so that the image in the vicinity of the edge portion of the last image slightly remains in the sheet S which remains, when printing according to the following print job data, the portion which remains from the last image is discarded since simple cutting of the leading edge is performed. Due to this, the appearance of the edge portions of either of the image sheets which are obtained are not spoilt.

Accordingly, the printer 100 of the first embodiment is able to reduce the amount of cutting waste generated without spoiling the appearance of the edge portions of each of the image sheets. In addition, it is possible to increase throughput since it is possible to simply perform single cutting instead of performing W cutting.

B. Second Embodiment

Figure 8:
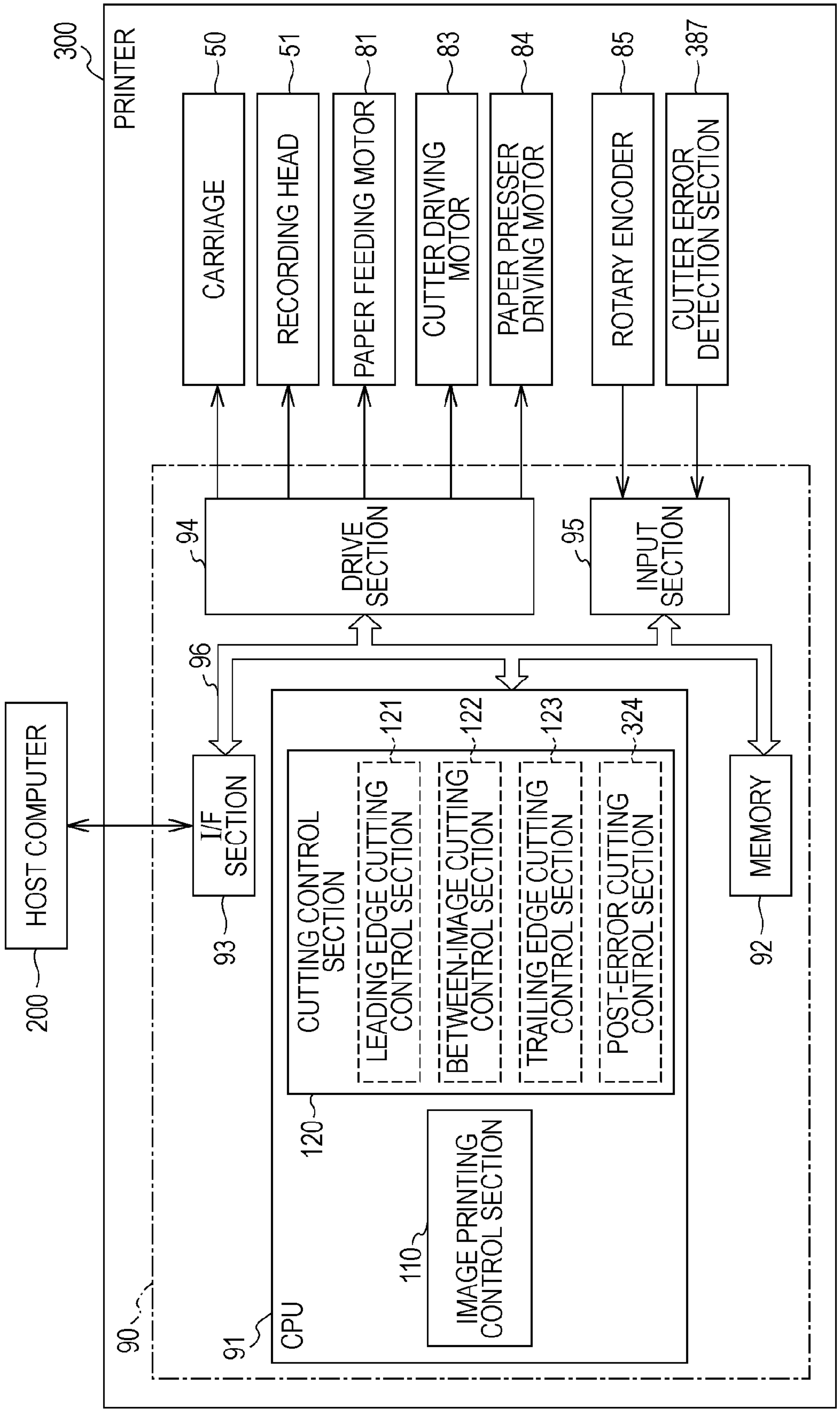
FIG. 8 is a block diagram illustrating an electrical configuration of a printer according to a second embodiment of the invention with a host computer.

FIG. 8 is a block diagram illustrating an electrical configuration of a printer 300 according to a second embodiment of the invention with the host computer 200. Compared to the printer 100 in the first embodiment, the printer 300 is different in that a cutter error detection section 387 is provided. The hardware differs only in this point and the other hardware is the same as the first embodiment. The same reference numerals as the first embodiment are applied in the configuration which is the same as the first embodiment.

The cutter device 60 (FIG. 1) is configured by being provided with the cutter carriage 62 which is provided with rotary cutter 61 as described in the first embodiment, but when the cutter carriage 62 moves, an error may occur where the cutter carriage 62 is stopped due to a paper jam. The cutter error detection section 387 detects abnormal stoppages of the cutter carriage 62 by detecting the position of the cutter carriage 62 and is connected to the input section 95 of the control section 90. The cutter error detection section 387 sends a cutter error notification to the input section 95 when an abnormal stoppage is detected.

Here, the CPU 91 provided in the control device 90 is provided with a post-error cutting control section 324 which functions due to software being executed. The software differs from the first embodiment in this point and the other software is the same.

Figure 9:
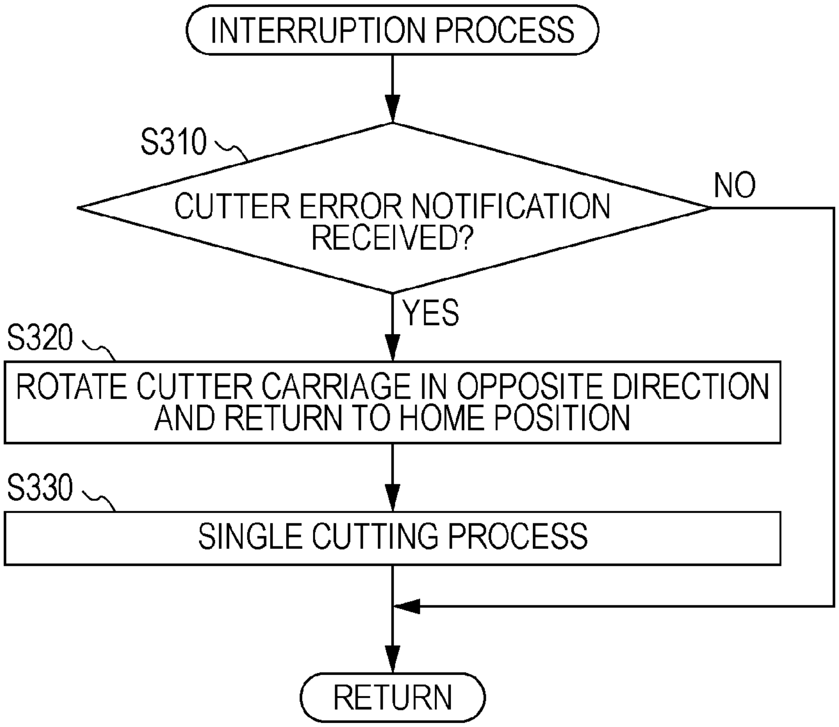
FIG. 9 is a flow chart illustrating an interruption process during a single cutting process or a W cutting process.

FIG. 9 is a flow chart illustrating an interruption process during the single cutting process or the W cutting process. The single cutting process or the W cutting process is the cutting process executed in steps S150, S190, or S210 in the job printing control process (FIG. 6) in the first embodiment. During these cutting processes, the process of FIG. 9 is executed with an interruption each time a predetermined period has elapsed.

When the process starts, first, the CPU 91 determines whether or not a cutter error notification has been received from the cutter error detection section 387 (step S310). Here, in a case where it is determined that the cutter error notification has not been received, the process proceeds to "return" and the interruption process ends.

On the other hand, in a case where it is determined in step S310 that the cutter error notification has been received, the cutter carriage 62 is returned to the home position by the cutter driving motor 83 being rotated in the opposite direction and the cutter carriage 62 moving in the opposite direction (step S320), and after that, the cutter driving motor 83 rotates in the normal direction and the sheet S is cut once (step S330). During the cutting, it is preferable if the cutting position is shifted from the cutting position when the paper jam occurred. Here, this is not always necessary and there may be a configuration where cutting is performed again at the cutting position when the paper jam occurred. Here, cutting is only performed once in step S330 during the single cutting process of the step S150 and step S210 in FIG. 6 and during the W cutting process of step S190 in FIG. 6. After the execution of step S330, the interruption process ends and the cutting process of steps S150, S190 or S210 is completed.

According to the printer 300 of the second embodiment configured as above, in a case where cutting is stopped during the cutting of the sheet S, the sheet S is cut again once. Due to the cutting, even in a case where an image slightly remains on the unused side of the sheet S, since single cutting is performed on the leading edge portion when printing according to the following print job data, the portion of the image which remains is discarded. Accordingly, it is possible to perform the printing according to the following print job data without any problems.

C. Third Embodiment

A third embodiment of the invention will be described. Compared to the printer 100 in the first embodiment, the printer according to the embodiment is different only in regard to the process of step S190 in the job printing control process (FIG. 6) executed by the CPU 91, and other steps and the configuration of the hardware is the same. Here, the description is performed below with the same reference numerals as the first embodiment being applied to the configuration which is the same as the first embodiment.

Figure 10:
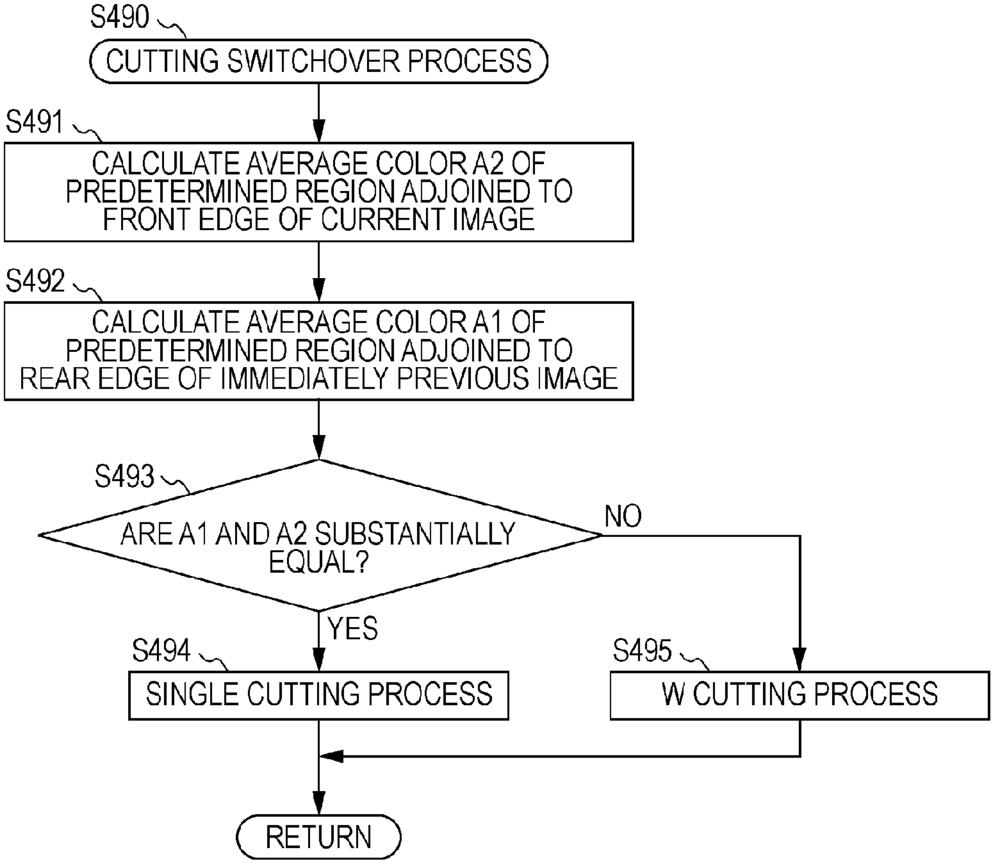
FIG. 10 is a flow chart illustrating a cutting switchover process which is executed according to a third embodiment of the invention.

FIG. 10 is a flow chart illustrating a cutting switchover process which is executed according to the third embodiment. The cutting switchover process is executed instead of step S190 in the job printing control process (FIG. 6). That is, in a case where it is determined in step S180 in FIG. 6 that the cutter blade 61 is at the cutting position which is determined from the boundary position between the current image and the immediately previous image, the process moves to step S491 of FIG. 10. In step S491, the CPU 91 specifies a predetermined region which is adjoined to the boundary position (front edge) on the downstream side in the transport direction X with regard to the current image and calculates an average color value A2 based on the pixel data of each pixel included in the predetermined region. Here, the "predetermined region" is a region which has a predetermined width in the transport direction X. The "average color value" is a value where a total of RGB average values (=(R component+G component+B component)/3) of each pixel data is determined and the total is divided by the number of pixels.

Next, the CPU 91 specifies a predetermined region which is adjoined to the boundary position (rear edge) on the upstream side in the transport direction X with regard to the immediately previous image and calculates an average color value A1 based on the pixel data of each pixel included in the predetermined region (step S492). Here, the "predetermined region" is a region which has the predetermined width in the transport direction X. The "average color value" is a value where a total of RGB average values (=(R component+G component+B component)/3) of each pixel data is determined and the total is divided by the number of pixels.

Figure 11:
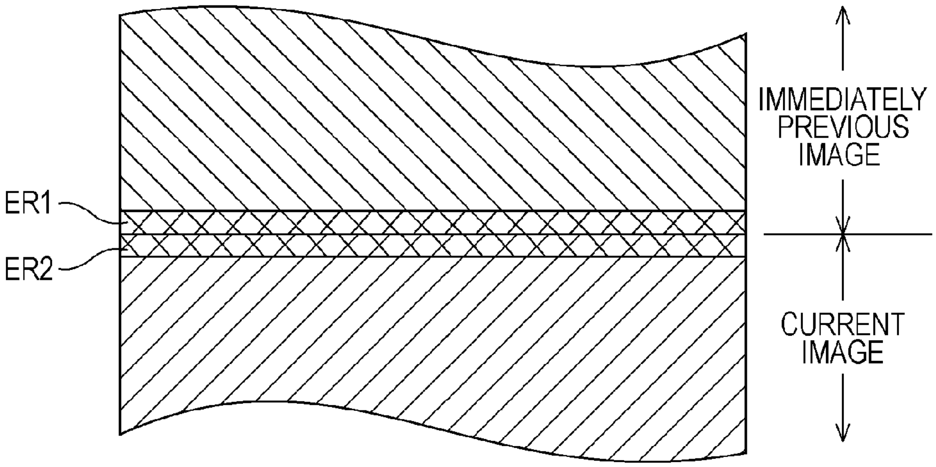
FIG. 11 is a diagram for describing a process of step S492.

FIG. 11 is a diagram for describing the process of step S492. In the diagram, ER2 is the predetermined region which is the target of the average color value A2 determined in step S491, and ER1 is the predetermined region which is the target of the average color value A1 determined in step S492.

After that, it is determined whether the average color value A2 determined in step S491 and the average color value A1 determined in step S492 are substantially the same (step S493). The determination of whether the values are substantially the same is performed by whether or not the difference of the values is within a predetermined range. In a case where it is determined in step S493 that the values are substantially the same, the paper feeding motor 81 is driven so that the cutter blade 61 is positioned at the boundary position between the current image and the immediately previously printed image, and after that, the single cutting process is performed where the cutter driving motor 83 is driven and the sheet S is cut once at the position (step S494). After executing step S494, the process ends at "return".

On the other hand, in a case where it is determined in step S493 that the average color value A1 and the average color value A2 are not substantially the same, the CPU 91 performs the W cutting process in the same manner as step S190 in the first embodiment, and after that, the process ends at "return".

According to the printer of the embodiment configured as above, in a case where color difference between two adjacent images is not small (that is, large), the W cutting process is performed in the same manner as the first embodiment, and in a case where color difference between two adjacent images is small, the single cutting process is performed. When cutting between two adjacent images, since the difference in color between the two images is small, the appearance of the edge portions of the image sheets obtained by the cutting are not spoilt even if there is deviation in the cutting position in the single cutting process. In addition, it is possible to reduce the amount of cutting waste generated by performing the single cutting instead of the W cutting process. Accordingly, the printer of the embodiment is able to reduce the amount of cutting waste generated without spoiling the appearance of the edge portions of each of the image sheets.

Here, in the embodiment, the color difference between the two images is determined based on the average color values determined from RGB average values described above but may not necessarily be based on the average color values and it is possible to change to other parameters such as brightness, hue, saturation, or the like if the parameter relates to color which expresses color tone perceived by people.

D. Modifications

D-1. Modification 1

In each embodiment and modification described above, there is a configuration where the recording medium is cut in order in the width direction by the cutter carriage being moved in the width direction of the recording medium, but instead of that, there may be a configuration where a cutter blade is prepared which has a cutting length which is the same as or greater than the width of the recording medium and cutting is performed with a guillotine method.

D-2. Modification 2

In each embodiment and modification described above, the sheet S which is the recording medium is a paper roll which is rolled in a roll shape but is not necessarily limited to this and may be paper with another elongated shape. In addition, it is not necessary for the recording medium to be paper and it is possible to use another recording medium such as film.

D-3. Modification 3

In each embodiment and modification described above, there is a configuration where the plurality of images based on the print job data are continuously printed out on the recording medium without any gaps, but instead of that, there may be a configuration where there is continuous printing with spaces of a predetermined width. In this case, the boundary position between adjacent images is the center portion of the space.

D-4. Modification 4

In each embodiment and modification described above, the ink jet printer has been described but it is possible to apply the invention to printers other than ink jet printers such as laser printers or impact printers. In addition, it is not necessary for the invention to be applied to a printer and it is possible to change to another recording device such as a facsimile.

Here, in the constituent elements of the embodiments and the modifications described above, the elements other than the elements in the independent claims are additional elements and can be arbitrarily excluded. In addition, the invention is not limited to the embodiments and the modifications, and various applications are possible within the scope which does not depart from the concept of the invention.

What is claimed is:

1. A printer comprising:

a transport unit which transports paper from upstream to downstream;

a head which prints a first image then prints a second image upstream of the first image on the paper, the first and second images being continuous on the paper; and a cutter which cuts the paper, wherein the cutter cuts using two modes:

a first mode in which the cutter cuts the paper once between the first and second images, or a second mode in which the cutter cuts the paper twice, once upstream of a boundary between the first image and the second image and once downstream of the boundary, where difference of a color value of a predetermined region in the first image and a color value of a predetermined region in the second image is within a predetermined range, the cutter cuts the paper using the first mode, wherein a size of the paper which is cut by the cutter using the second mode is specified based on a predetermined color value of the first image and the second image.

2. The printer according to claim 1, wherein the cutter cuts the paper while moving in a predetermined direction, and where there is an error when the cutter is cutting at a predetermined location on the paper, the cutter moves in an opposite direction to the predetermined direction, the transport unit transports the paper, and the cutter cuts at a location different from the predetermined location.

3. A recording and cutting control method comprising:

transporting paper from upstream to downstream;

prints a first image then prints a second image upstream of the first image on the paper, the first and second images being continuous on the paper; and cutting the paper, wherein there are two cutting modes:

a first mode in which cutting the paper once between the first and second images, or a second mode in which cutting the paper twice, once upstream of a boundary between the first image and the second image and once downstream of the boundary, wherein difference of a color value of a predetermined region in the first image and a color value of a predetermined region in the second image is within a predetermined range, cutting the paper using the first mode, wherein a size of the paper which is cut using the second mode is specified based on a predetermined color value of the first image and the second image.

* * * * *